US012762845B2

(12) United States Patent
Chen et al.

(10) Patent No.: US 12,762,845 B2
(45) Date of Patent: Oct. 13, 2026

(54) SELF-SUPERVISED COLLABORATIVE APPROACH TO MACHINE LEARNING BY MODELS DEPLOYED ON EDGE DEVICES

(71) Applicant: Wyze Labs, Inc., Kirkland, WA (US)

(72) Inventors: Lin Chen, Seattle, WA (US); Mohammadmahdi Kamani, Bellevue, WA (US); Zhongjie Yu, Bellevue, WA (US)

(73) Assignee: Wyze Labs, Inc., Kirkland, WA (US)

( * ) Notice: Subject to any disclaimer, the term of this patent is extended or adjusted under 35 U.S.C. 154(b) by 397 days.

(21) Appl. No.: 18/546,227

(22) PCT Filed: Feb. 11, 2022

(86) PCT No.: PCT/US2022/016117
§ 371 (c)(1),
(2) Date: Aug. 11, 2023

(87) PCT Pub. No.: WO2022/174033
PCT Pub. Date: Aug. 18, 2022

(65) Prior Publication Data
US 2024/0135688 A1 Apr. 25, 2024

Related U.S. Application Data

(60) Provisional application No. 63/148,852, filed on Feb. 12, 2021.

(51) Int. Cl.
*G06V 20/52* (2022.01)
*G06V 10/774* (2022.01)
*G06V 10/94* (2022.01)

(52) U.S. Cl.
CPC ............ *G06V 10/774* (2022.01); *G06V 10/95* (2022.01); *G06V 20/52* (2022.01)

(58) Field of Classification Search
CPC ...... G06V 10/774; G06V 10/95; G06V 10/96; G06V 20/52; G06N 3/098; G06N 3/084
See application file for complete search history.

(56) References Cited

U.S. PATENT DOCUMENTS

| | | | | |
|---|---|---|---|---|
| 9,390,378 | B2 | 7/2016 | Garera et al. | |
| 12,072,954 | B1 * | 8/2024 | Li | G06F 18/2148 |

(Continued)

FOREIGN PATENT DOCUMENTS

| | | | | |
|---|---|---|---|---|
| CN | 110414373 | A * | 11/2019 | G06F 18/214 |
| CN | 111582016 | A * | 8/2020 | G06F 18/241 |
| CN | 111625361 | A * | 9/2020 | G06N 3/045 |

OTHER PUBLICATIONS

Translated Version of CN 111625361 (Year: 2020).*

(Continued)

*Primary Examiner* — Carol W Chan
(74) *Attorney, Agent, or Firm* — Ashurst Perkins Coie US LLP; Nicole Dunham; Andrew T. Pettit

(57) ABSTRACT

Introduced here is an approach to developing and then deploying machine learning models that addresses the drawbacks of conventional approaches. One objective of the approach described herein is to reduce or eliminate the need for manual labelling during the development process. To accomplish this, a surveillance system may implement self-supervised learning and knowledge distillation that rely on collaboration between its edge devices and a server system. Together, self-supervised learning and knowledge distillation ensure that the models deployed on those edge devices can be readily trained and then updated, as necessary, in order to improve inference quality without any human intervention.

10 Claims, 8 Drawing Sheets

(56) References Cited

U.S. PATENT DOCUMENTS

| | | | | |
|---|---|---|---|---|
| 2011/0096149 | A1 | 4/2011 | Au et al. | |
| 2015/0093035 | A1 | 4/2015 | Saptharishi et al. | |
| 2016/0358099 | A1 | 12/2016 | Sturlaugson et al. | |
| 2017/0330029 | A1 | 11/2017 | Turcot et al. | |
| 2018/0032915 | A1* | 2/2018 | Nagaraju | G06V 10/776 |
| 2018/0349709 | A1* | 12/2018 | Shinohara | G06V 20/52 |
| 2019/0279082 | A1* | 9/2019 | Moloney | G06V 10/96 |
| 2020/0265301 | A1* | 8/2020 | Burger | G06N 3/08 |
| 2020/0293887 | A1* | 9/2020 | De Brouwer | G06N 3/09 |
| 2021/0027103 | A1* | 1/2021 | Brower | G06N 3/088 |
| 2022/0038534 | A1* | 2/2022 | Saraf | G06N 3/0464 |

OTHER PUBLICATIONS

Zhuang, Weiming, Yonggang Wen, Xuesen Zhang, Xin Gan, Daiying Yin, Dongzhan Zhou, Shuai Zhang, and Shuai Yi. "Performance optimization of federated person re-identification via benchmark analysis." In Proceedings of the 28th ACM international conference on multimedia, pp. 955-963. 2020. (Year: 2020).*

Chen, Chien-Hung, Che-Rung Lee, and Walter Chen-Hua Lu. "Smart in-car camera system using mobile cloud computing framework for deep learning." Vehicular Communications 10 (2017): 84-90. (Year: 2017).*

ISA/US, International Search Report and Written Opinion mailed May 23, 2022 for PCT/US22/16117 filed Feb. 11, 2022, Applicant: Wyze Labs, Inc., 17 pages.

Jeong, Wonyong et al: "Federated Semi-Supervised Learning with Inter-Client Consistency", arxiv.org, Cornell University Library, 201 Olin Library Cornell University Ithaca, NY 14853, Jul. 2020; 7 pages.

Mittal, Varnit et al: "Smart Surveillance Systems with Edge Intelligence: Convergence of Deep Learning and Edge Computing", SSRN Electronic Journal, May 2020; 5 pages.

Zhang, Xingzhou et al: "OpenEl: An Open Framework for Edge Intelligence", 2019 IEEE 39th International Conference on Distributed Computing Systems (ICDCS), IEEE, Jul. 2019; 12 pages.

Zhao, Yuchen et al: "Semi-supervised Federated Learning for Activity Recognition", arxiv.org, Cornell University Library, 201 Olin Library Cornell University Ithaca, NY 14853, Nov. 2020; 12 pages.

* cited by examiner

SELF-SUPERVISED COLLABORATIVE APPROACH TO MACHINE LEARNING BY MODELS DEPLOYED ON EDGE DEVICES

CROSS-REFERENCE TO RELATED APPLICATIONS

This application claims priority to U.S. Provisional Application No. 63/148,852, titled "SELF-SUPERVISED COLLABORATIVE APPROACH TO MACHINE LEARNING BY MODELS DEPLOYED ON EDGE DEVICES" and filed on Feb. 12, 2021, which is incorporated herein by reference in its entirety.

TECHNICAL FIELD

Various embodiments concern surveillance systems and associated techniques for developing and training software-implemented models on edge devices of those surveillance systems.

BACKGROUND

The term "surveillance" refers to the monitoring of behavior, activities, and other changing information for the purpose protecting people or items in a given environment. Generally, surveillance requires that the given environment be monitored using electronic devices such as digital cameras, lights, locks, motion detectors, and the like. Collectively, these electronic devices may be referred to as the "edge devices" of a "surveillance system" or "security system."

One concept that is becoming more commonplace in surveillance systems is edge intelligence (also referred to as "edge analysis"). Edge intelligence refers to the ability of the electronic devices included in a surveillance system to process information and make decisions prior to transmission of that information elsewhere. As an example, a digital camera (or simply "camera") may be responsible for discovering the objects that are included in digital images (or simply "images") before those images are transmitted to a destination. The destination could be a computer server system that is responsible for further analyzing the images.

Being able to locally perform tasks has become increasingly important as the information generated by electronic devices continues to increase in scale. Assume, for example, that a surveillance system that is designed to monitor a home environment includes several cameras. Each of these cameras may be able to generate high-resolution images that are several megapixels (MP) in size. While these high-resolution images provide greater insight into the home environment, the large size makes these images difficult to handle due to the significant bandwidth and storage requirements. For this reason, it may be beneficial to determine which, if any, images generated by the cameras over a given timeframe should be forwarded onward to another component of the surveillance system for further analysis. Edge intelligence can be used to ensure that only those images that are deemed important are forwarded onward by these cameras. This is based on the premise that the surveillance system will be more interested in, for example, the few minutes during which an unknown individual approaches the door of a home rather than multiple hours during which the front stoop of the home is unoccupied.

Figure 1:
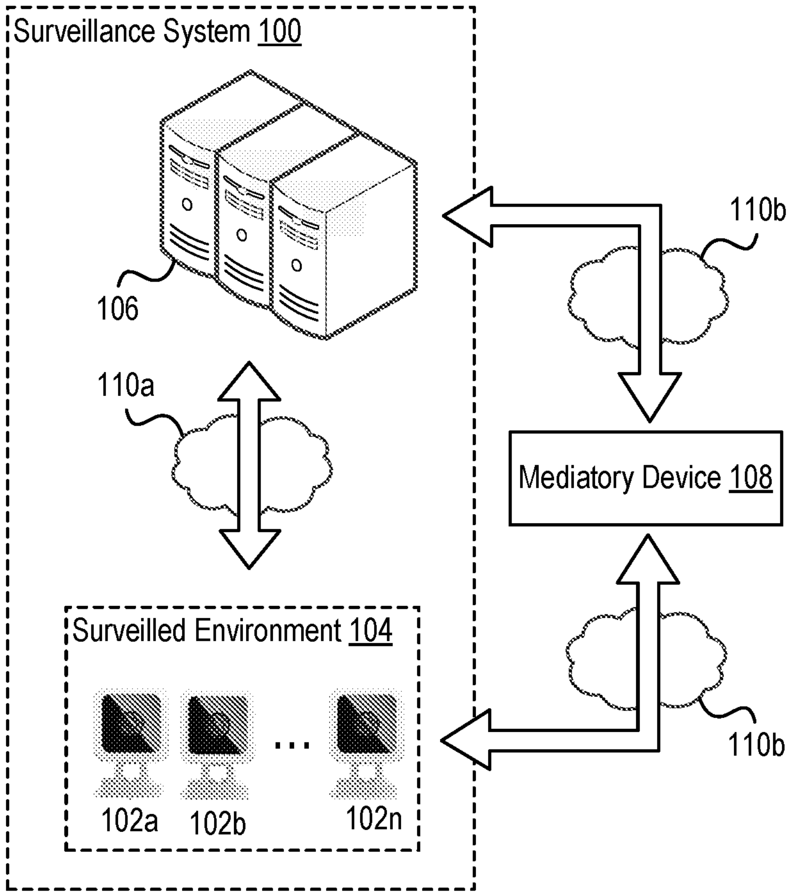
FIG. 1 includes a high-level illustration of a centralized surveillance system that includes various edge devices that are deployed throughout an environment to be surveilled.

Various features of the technology described herein will become more apparent to those skilled in the art from a study of the Detailed Description in conjunction with the drawings. Embodiments are illustrated by way of example and not limitation in the drawings. Although the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION

Edge intelligence may require that machine learning models (or simply "models") be applied by at least some of the electronic devices included in a surveillance system. Because these electronic devices represent the points through which data enters the surveillance system, these electronic devices may be referred to as "edge devices." The conventional approach to developing a model for an edge device requires that data be collected, labelled, and then used for training. Moreover, the trained model may be tuned to improve its ability to produce appropriate outputs prior to deployment in the edge device. These outputs may be referred to as "predictions" or "inferences." The trained model may be tuned to ensure that characteristics of the edge device or its ambient environment are properly accounted for.

Labelling the data that is to be used for training is normally done in a deliberate and measured manner, and thus tends to inhibit the timely deployment of models. Said another way, labelling tends to be the primary bottleneck of the conventional approach described above. Large amounts of labelled data are required to train models that are otherwise ready for deployment in edge devices. However, labelling tends to be not only expensive but also time consuming due to the amount of human involvement that is required.

Moreover, any subsequent updates to a model will require that the conventional approach be completed again in its entirety. Assume, for example, that a first version of a model trained for object recognition is presently deployed on a camera. Thereafter, it may be determined (e.g., by a developer or manufacturer) that it would be desirable for the model to be able to better recognize objects in images generated by the camera. As an example, the first version of the model may have been trained using images captured under daytime lighting conditions, and thus may experience poor performance when examining images captured under nighttime lighting conditions. In such a scenario, it may be desirable to further train the model using images captured under nighttime lighting conditions so as to produce a second version of the model that is able to better recognize objects under nighttime lighting conditions. Then, the second version of the model will be deployed on the camera so as to replace the first version of the model. This approach is quite burdensome, and it makes it difficult for models to evolve following deployment.

Introduced here is an approach to developing and then deploying models that addresses the above-mentioned drawbacks of conventional approaches. One objective of the approach described herein is to reduce or eliminate the need for manual labelling during the development process. To accomplish this, a surveillance system may implement self-supervised learning that relies on collaboration between its edge devices and a server system (also referred to as a "cloud system"). Self-supervised learning ensures that the models deployed on those edge devices can be readily trained and then updated, as necessary, without any human intervention.

Figure 4:
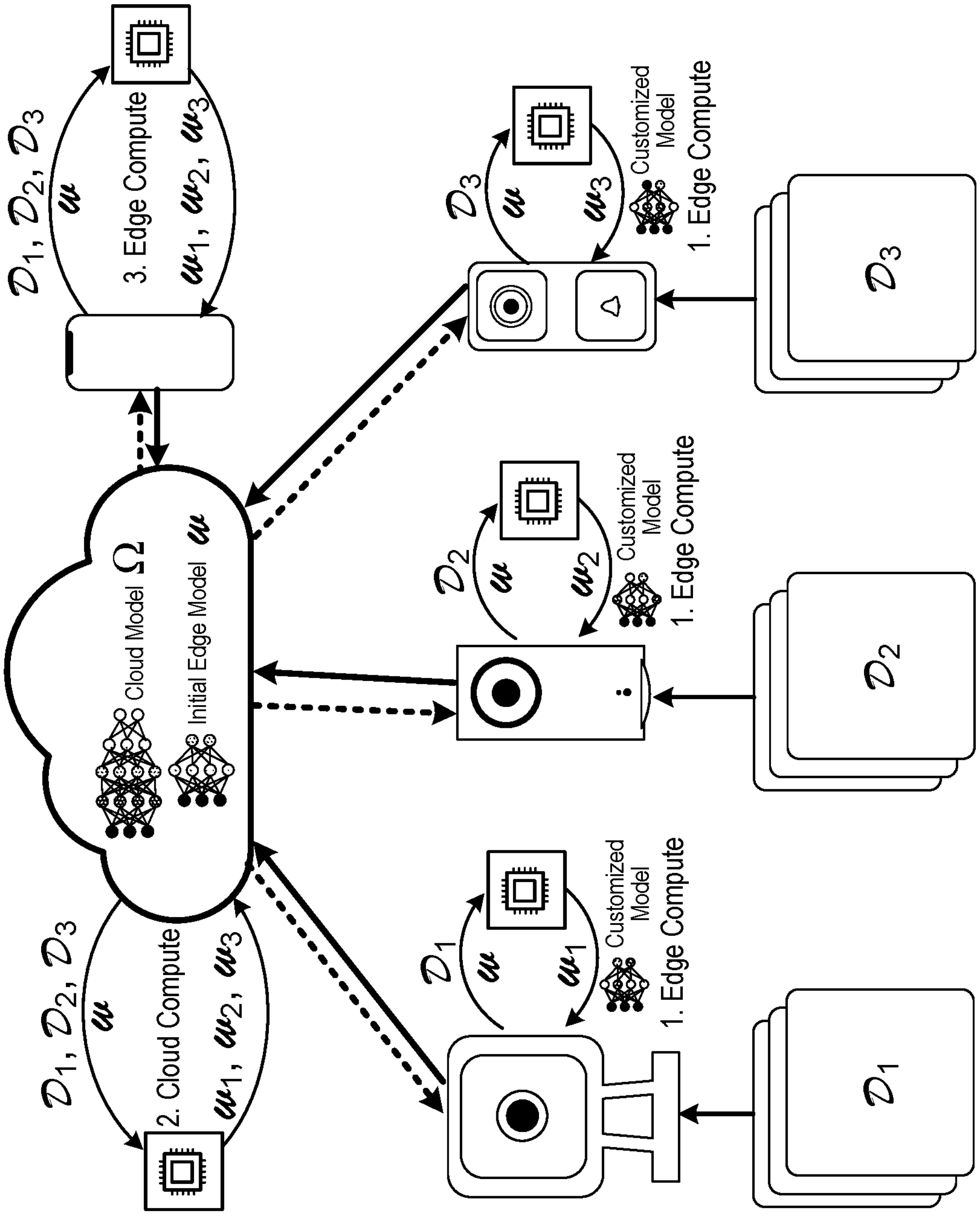
FIG. 4 includes a high-level schematic illustration of a surveillance system for which self-supervised customization is performed for models employed by edge devices.

At least some of the edge devices in a surveillance system may execute models for inference or predictive purposes. Those models may be altered based on the context or content or data that is provided as input in order to improve performance with regards to local use. As shown in FIG. 4, there may be three different models involved in the collaborative framework described herein, namely,

- A global model ($\omega$) that is trained to be run on various edge devices using supervised training data available on the server system. As further discussed below, the global model can be distributed to various edge devices to be used for inference purposes.
- An edge model ($\omega_i$) that represents a localized version of the global model. The edge model (also referred to as the "local model" or "student model") has the same structure and parameter size as the global model. However, using the collaborative framework described herein, the parameters of each edge model can be updated and localized based on the data generated by the corresponding edge device.
- A cloud-based model ($\Omega$) (or simply "cloud model") that usually has a more complex structure and larger parameter size than the global and edge models. Inferences by the cloud model (also referred to as the "teacher model") may only be made on the server system due to its high computational demand. Since the cloud model has a richer feature representation than the global and edge models, it can be used in knowledge distillation to distill knowledge to the edge models.

Together, the edge devices and server system represent a decentralized surveillance system that is capable of collecting and augmenting data, as well as facilitating self-supervised training using the data. All of these actions can be performed automatically in order to bolster the quality of the models executed by the edge devices. At a high level, the collaborative approach mentioned above ensures that each edge device can develop a customized model that is tailored specifically for the data that is being generated, acquired, or otherwise obtained. In some embodiments, training is performed continuously so that local models are perpetually adapted by the edge devices in response to environment shift in the data used by those local models. Said another way, each edge device may be configured to update a corresponding model executing therein to account for changes in the data that is fed into the corresponding model as input. Note, however, that updates need not necessarily be implemented by the edge devices. As further discussed below, updates could be implemented by the edge devices, server system, or a mediatory device such as a mobile phone, tablet computer, or base station of the surveillance system.

To summarize, there are several core aspects of the approach described herein:

- First, an end-to-end framework for independently adapting models deployed on edge devices so as to account for the data generated by those edge devices in accordance with an edge-cloud collaborative scheme;
- Second, a training process that is designed to work without any human intervention or supervision; and
- Third, a training process can be performed continuously in order to readily adapt to changes in the data distribution of each edge device.

The approach described herein may be particularly suitable for models that are deployed on edge devices, such as cameras, lights, locks, sensors, and the like. Note, however, that while embodiments may be described with reference to particular models and edge devices, the technology may be similarly applicable to other models and edge devices. For example, for the purpose of illustration, an embodiment may be described in the context of a model that is designed to recognize instances of objects included in images that are generated by a camera. Such a model may be referred to as an "object recognition model." But those skilled in the art will recognize that the technology may be similarly applicable to other types of models and other types of edge devices.

Moreover, embodiments may be described in the context of computer-executable instructions for the purpose of illustration. Aspects of the technology could be implemented via hardware, firmware, or software. For instance, an edge device may be configured to generate data that is representative of an ambient environment and then provide the data to a model as input. The edge device can then determine, based on the output produced by the model, an appropriate course of action. The edge device may also examine the data on a periodic or continual basis. If the edge device determines that there has been a meaningful shift in the context or content of the data, then the edge device may initiate a process for updating the model. The term "meaningful shift" may refer to a change in the data that will influence the usefulness of outputs produced the model. As an example, if the furniture in a home under surveillance by a camera changes in color or form, then the context of images generated by the camera will change. This change in context may result in an object recognition model that resides on the camera to suffer a decrease in performance. Thus, it may be desirable to adapt the object recognition model to changes in context to ensure performance remains high. As another example, it may be desirable to periodically update an object recognition model employed by a camera responsible for monitoring an external environment (e.g., a backyard) to account for changes in meteorological season.

Terminology

References in this description to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense. Thus, unless otherwise noted, the term "based on" is intended to mean "based at least in part on."

The terms "connected," "coupled," and any variants thereof are intended to include any connection or coupling between objects, either direct or indirect. The connection/coupling can be physical, logical, or a combination thereof. For example, objects may be electrically or communicatively coupled to one another despite not sharing a physical connection.

The term "module" may be used to refer broadly to software, firmware, or hardware. Modules are typically functional components that generate one or more outputs based on one or more inputs. A computer program may include one or more modules. Thus, a computer program may include multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open ended.

Overview of Surveillance System

FIG. 1 includes a high-level illustration of a centralized surveillance system 100 that includes various edge devices 102*a-n* that are deployed throughout an environment 104 to be surveilled. While the edge devices 102*a-n* in FIG. 1 are cameras, other types of edge devices could be deployed throughout the environment 104 in addition to, or instead of, cameras. Meanwhile, the environment 104 may be, for example, a home or business.

In some embodiments, these edge devices 102*a-n* are able to communicate directly with a server system 106 that is comprised of one or more computer servers (or simply "servers") via a network 110*a*. In other embodiments, these edge devices 102*a-n* are able to communicate indirectly with the server system 106 via a mediatory device 108. The mediatory device 108 may be connected to the edge devices 102*a-n* and server system 106 via respective networks 110*b-c*. The networks a-c may be personal area networks (PANs), local area networks (LANs), wide area networks (WANs), metropolitan area networks (MANs), cellular networks, or the Internet. For example, the edge devices 102*a-n* may communicate with the mediatory device via Bluetooth®, Near Field Communication (NFC), or another short-range communication protocol, and the edge devices 102*a-n* may communicate with the server system 108 via the Internet.

Generally, a computer program executing on the mediatory device 108 is supported by the server system 106, and thus is able to facilitate communication with the server system 106. The mediatory device 108 could be, for example, a mobile phone, tablet computer, or base station. Thus, the mediatory device 108 may remain in the environment 104 at all times, or the mediatory device 108 may periodically enter the environment 104.

In a centralized surveillance system, a global model is created and then trained by the server system 106 in a supervised manner until acceptable performance is attained on a test dataset. The global model is then deployed to the edge devices 102*a-n* for inference. As mentioned above, this process involves collecting and then annotating or labelling data, training and then tuning the global model, and deploying the global model to various edge devices. The global model that is produced by this process is deployed to all edge devices of the same type for inference. As an example, an object recognition model trained and tuned by the server system 106 may be implemented by all cameras deployed in the environment 104 of interest. However, since the distribution of data could dramatically change from one edge device to another, or even on a single edge device over time, a global model is largely unsuitable. Simply put, the global model will be unable to capture the nuances of the different locations in which the edge devices 102*a-n* are deployed. As such, performance will not be consistent and can actually degrade over time across the edge devices 102*a-n*. Moreover, annotating data generated by the edge devices 102*a-n* in order to train the respective versions of the global model is simply impractical as it is too laborious and very difficult, if not impossible, to accomplish in a timely manner.

The collaborative approach described herein attempts to tackle these problems by allowing the edge devices 102*a-n* to tune the global model based on their respective data distributions. Thus, each edge device may have its own customized model that is adapted based on its own data. As further discussed below, this can be done in a self-supervised manner so as to eliminate the need for any human intervention.

Figure 2:
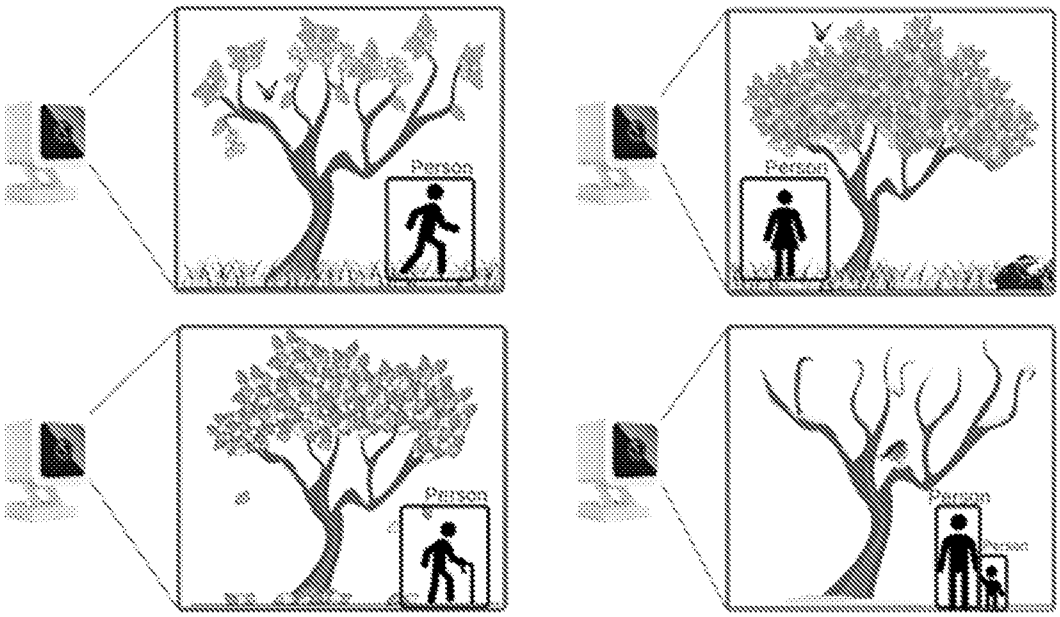
FIG. 2 illustrates how the environmental context of the data generated by an edge device may change over time, thereby causing its data distribution to also change over time.

FIG. 2 illustrates how the environmental context of the data generated by an edge device may change over time, thereby causing its data distribution to also change over time. For this reason, it may be desirable to update the model employed by the edge device to adapt to these local chances in data distribution. In FIG. 2, an edge device (here, a camera) has been deployed such that it has a certain view of an environment to be surveilled. The context (e.g., the background) of this view, as well as the objects of interest, may shift dramatically over time. This distribution shift in data (e.g., images) generated by the edge device can greatly affect the performance of the model that is employed by the edge device to the data. As such, it is important to update the model to ensure that the model is suitable for changes in the context of the environment (and thus content of the data).

One of the main challenges in accomplishing this is that the data generated by an edge device will not have ground truth labels (also referred to as "ground truth annotations"). Thus, the data cannot be used in a supervised fashion to update the model using known techniques such as fine tuning. To address this challenge, and to avoid requiring any human intervention, self-supervised learning can be combined with knowledge distillation methods that attempt to learn the representation of data on each edge device, while matching performance against a more powerful model. As further discussed below, this approach relies on comparisons of the outputs produced by local models that are employed by edge devices and outputs produced by a global model that is employed by a server system to which the edge devices are communicatively connected. To accomplish this, some pretext tasks (also referred to as "auxiliary tasks") that involve performing supervision based on unlabeled data may need to be defined and then used to minimize the loss on specific tasks related to a main goal. The main goal of the model will depend on the type of edge device. For example, the main goal for a model employed by a camera may be object detection. While the objective of the pretext tasks is not particularly important, performance of these tasks helps to improve the representation of data distribution on each edge device for the main goal.

To summarize, the collaborative approach described herein has been developed to address three problems. First, shifts in the distribution of the data generated by an edge device that can result in degradation of performance of a model employed by the edge device. Second, costs and delays that are inherent in having humans label data to be used for tuning models deployed on edge devices. Third, inaccurate feedback from the humans that are responsible for labelling the data that will inevitably degrade performance of the models even more.

Overview of Collaborative Approach to Adapting Models

There are two main goals of the approach described herein. The first (and primary) goal is to have customized models that are independently adapted for the edge devices of a surveillance system. The second goal is to achieve the first goal in a self-supervised manner that is combined with knowledge distillation methods in collaboration with surveillance systems that include local components (e.g., edge devices) and remote components (e.g., server system). Each of these goals has been explored to some extent by different entities.

For the first goal, the most closely related work has focused on personalization in the context of federated learning. In federated learning, the goal is to learn a global model using decentralized data on edge devices without directly accessing the data generated by those edge devices. In such settings, the edge devices maintain control of their own data but can update the global model provided by a server system using their own data. The goal of personalization in the context of federated learning is to improve the generalization capabilities of the local model on each edge device based on its own test data. However, almost all of these approaches to personalization in the context of federated learning (i) rely on labelled data and (ii) update the local models in a supervised manner. Moreover, updating of each local model is confined to the corresponding edge device, and thus cannot be relayed or conveyed to other parts of the surveillance system.

For the second goal, several entities have investigated how to use test data or unlabeled data to improve the performance of a model in completing an inference task in a self-supervised manner. Mostly, these efforts have attempted to achieve better results in terms of inference on out-of-distribution data that was not used while training the model. These efforts normally involve creating an auxiliary task to provide another form of supervision. A loss function can be defined for that auxiliary task and then the model can be updated based on the loss function. For example, rotating images that are generated by a camera and then adding a classification layer on top of the feature representation produced by a model as output to classify the degree of rotation is a simple auxiliary task that introduces a form of supervision. As mentioned above, the ultimate goal of these efforts was to improve the representation capability of models for out-of-distribution samples and not necessarily to directly improve the main task as the approach described herein does.

Thus, there have been efforts to accomplish the above-mentioned goals. However, the approach described herein is advantageous in several respects.

First, knowledge distillation has been somewhat widely used for model compression in classification tasks. However, there have been few efforts to apply knowledge distillation to other tasks, such as object recognition and object detection. Here, knowledge distillation is combined with self-supervised learning techniques to improve the representation power of a student model with the assistance of a teacher model. Note that while the framework may be described in the context of object recognition for the purpose of illustration, the approach can be generalized to other tasks.

Second, while personalized approaches to self-supervised learning have been discussed in the context of various tasks, the approach described herein employs self-supervised learning in a novel manner. At a high level, the approach has been designed so as to ensure that end-to-end development (e.g., creating, training, and tuning) can be accomplishing without any human intervention.

Third, performance of models employed by edge devices can be easily measured. This allows the degradation in performance to be readily discovered. When the performance of a model falls below a threshold for a specific amount of time (e.g., several hours or days), the model may be automatically adapted to ensure that it is appropriately tailored for its data. This adaptation procedure may be performed perpetually, so that local models are consistently adapted to shifts in distribution of data generated by the corresponding edge devices.

Fourth, collaboration between student models deployed on edge devices and a teacher model deployed on a server system ensures high performance can be maintained. In the approach described herein, the teacher model may serve as a reference that can be used to bolster or improve the representation power of each student model through knowledge distillation and self-supervision.

A. Introduction of Collaborative Framework

An edge device can provide data that it generates to a model so as to produce an output (also referred to as a "prediction" or "inference") that is relevant to a task. The task will depend on the nature of the edge device itself. For example, if the edge device is a camera, then the task may be to detect objects in images generated by the camera. To do this, the camera may employ a model that has been trained to detect those objects and then localize each detected object using a bounding box. To train the model, images of those objects in different contexts can be fed into the model as training data. However, no matter how diverse the training data is, it cannot capture the entire distribution of images that may be generated by cameras that will employ that model. Therefore, performance of the model will degrade on cameras that generate images which are not comparable to the training data in terms of content.

Introduced here is a collaborative framework that was developed in an attempt to address this issue. Rather than rely solely on improved training and tuning prior to deployment, the collaborative framework allows models to be adapted following deployment based on the data generated by the corresponding edge devices. Assume, for example, that a global model has been trained by a server system for object detection. This global model can then be provided to cameras deployed throughout an environment of interest.

Using the collaborative framework described herein, each local version of the global model can be adapted to account for the content of images generated by the corresponding camera.

Figure 3:
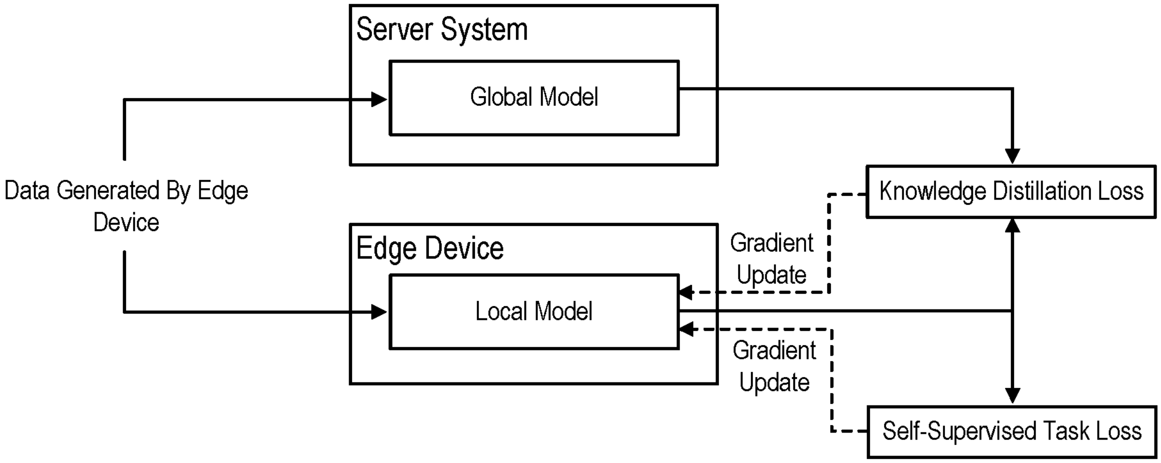
FIG. 3 includes a schema for an example of an algorithm that is designed in accordance with a collaborative framework.

To update a local version of the global model, the edge device would normally need to have access to labels (e.g., the tags and bounding boxes) for each sample (e.g., image) to be used for updating. But these labels will not be available without human intervention, and so supervised learning cannot be used to update the local version of the global model. For that reason, the collaborative framework can utilize self-supervised learning in addition to knowledge distillation to adapt the local versions of the global model. FIG. 3 includes a schema for an example of an algorithm that is designed in accordance with a collaborative framework. Assume, for example, that a local version of a global model that is implemented on an edge device is to be adapted. As noted above, this local version of the global model may be referred to as a "local model." In order to do this, the edge device must first gather the data to be used in the adaptation process. This "new data" can be fed into the local and teacher models, and the outputs produced at different layers in the local model can be computed. Then, two different losses can be used to update the local model.

The first loss is referred to as the "knowledge distillation loss." At a high level, the idea of knowledge distillation in this setting is that the teacher model is likely more powerful in terms of feature representation than the local model. Thus, in the scenario where a new distribution of data has caused confidence of the local model to lessen, the global model with its richer feature representative can help the local model to adapt to the new distribution. This can be done using knowledge distillation loss, which captures how different the feature representations of the local and global models are on the new data. The gradient update from the knowledge distillation loss can be used to improve adaptation of the local model.

The second loss is referred to as "self-supervised task loss" or "self-supervised loss." Since there are no labels available for the new data in this scenario, self-supervised tasks must be defined in order to update the local model. Each self-supervised task will have its own loss, which can be used to update the parameters of the local model. There are a variety of self-supervised tasks for vision-focused models, and any of these self-supervised tasks can be seamlessly used within the collaborative framework.

As shown in FIG. 3, these losses and corresponding gradients can be used to update the local model. In particular, these losses and corresponding gradients can be used to update the parameters of the local model, thereby tuning the local model following deployment of the edge device.

For the knowledge distillation loss, feature representation can be used in different levels and output distribution probability (also referred to as "class distribution probability") can be used to match features of the local model to corresponding features of the teacher model. This loss can include, but is not limited to, knowledge distillation losses such as Euclidean distance for feature maps and Kullback-Leibler (K-L) divergence for output distribution probabilities.

For the self-supervised loss, pretext tasks different from the main goal of the model can be introduced as a means for supervision. The pretext tasks may be based on the nature of the edge device, the nature of the data generated by the edge device, or the nature of the local model. For example, the pretext tasks may be selected for each edge device using metrics such as gradient diversity or Shapely value to determine the quality of the update from each pretext task. Each pretext task will correspond to a loss function, and using the collective loss of the pretext tasks, the global model can be updated to adapt its representation to account for the data generated by the edge device. As an example, if m different pretext tasks with loss functions as $\O_j(.,..;.)$, $j \in \{1, \ldots, m\}$ are used, then the total loss for the self-supervised task can be written as follows:

$$\mathcal{L}_i(\mathcal{D}_i, \omega_i) \triangleq \psi_i\big(\phi_1(\mathcal{D}_i, \mathcal{Y}_i^1; \omega_i), \ldots, \phi_m(\mathcal{D}_i, \mathcal{Y}_i^m; \omega_i)\big), \quad \text{Eq. 1}$$

where $\mathcal{L}_i$ is the loss of self-supervised tasks on the i-th edge device with input data of $\mathcal{D}_i$ and model parameters $\omega_i$. The function $\psi_i$ is the aggregator function for m different pretext tasks' losses, and $\mathcal{Y}_i^j$ is the corresponding label generated for task j in the i-th edge device. The aggregator function could have different forms in different edge devices. For example, the aggregator function may have a weighted average over different tasks. Using the gradients over this loss function with respect to the model parameters, the feature representation of the local model can be updated to adapt to the new distribution of data generated by the edge device.

Thereafter, the edge device can use the adapted local model to derive insights from data that is generated. Said another way, the edge device can use the adapted local model to derive inferences from the data. FIG. 4 includes a high-level schematic illustration of a surveillance system for which self-supervised customization is performed for models employed by edge devices. In this situation, teacher model Ω is maintained in the cloud, for example, on a server system that is accessible via the Internet. Global model Ω is used as a teacher model by the edge devices, each of which may run a less computationally intensive version referred to as local model ω. Each local model ω can be adapted based on data that is generated by the corresponding edge device, thereby producing adapted local models that are denoted $\omega_i$. Computation for backpropagating the gradients and updating the local models can be handled in any of the following places:

- The edge device itself can compute those gradients and then update the model based on the data that it generates. This option is desirable since the communication cost is minimal and privacy of the data can be preserved.
- The server system may be responsible for computing updates for the local models deployed on edge devices. This can be done in a siloed manner so that the server system adapts each local model using only data generated by the corresponding edge device. In this situation, data will be transferred to the server system by each edge device, and then a customized version of the global model can be returned to each edge device.
- A mediatory device may be responsible for computing updates for the local models deployed on edge devices. A mediatory device may be communicatively connected to the server system and/or the edge devices included in a surveillance system. Examples of mediatory devices include mobile phones, tablet computers, and base stations. Generally, mediatory devices have more computational power than edge devices, and thus may be better able to handle the computing needed to update the local models.

Figure 5:
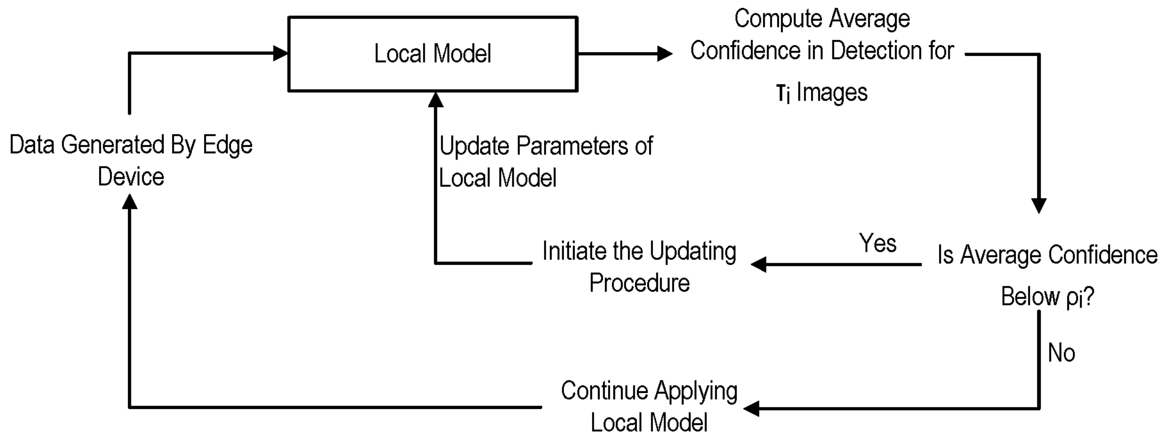
FIG. 5 includes a high-level flowchart that illustrates how average confidence in outputs produced by a local model trained for object detection can be calculated in an ongoing manner in order to establish when the local model should be updated.

The collaborative framework may be implemented so that local models can be continuously updated to account for changes in the distribution of data generated by the corresponding edge devices. Due to the significant computational resources needed to continuously update a local model, however, the collaborative framework may have a mechanism that ensures the local model is updated only when necessary. The key challenge is defining the frequency with which updates should occur. Updates should occur regularly enough that local models remain accurate, but not so often that performance of surveillance systems suffers due to limitations on bandwidth or processing resources. To automatically establish the optimal time to initiate the updating procedure, the edge device can monitor the confidence of the model in outputs that are produced over time. When the confidence falls beneath a threshold and remains beneath the threshold for a predetermined amount of time, the edge device can initiate the updating procedure. Alternatively, the edge device may initiate the updating procedure responsive to a determination that a certain amount of data (e.g., a certain number of images) has been generated since the local model was last trained. As mentioned above, the updating procedure could also be triggered by the server system or the mediatory device. Accordingly, to initiate the updating procedure, the average confidence level (denoted by $\rho_i$) of the model on the i-th edge device may need to fall beneath a threshold and the remain beneath the threshold for a predetermined interval of time (denoted by $\tau_i$). FIG. 5 includes a high-level flowchart that illustrates how average confidence in outputs produced by a local model trained for object detection can be calculated in an ongoing manner in order to establish when the local model should be updated.

B. Methodologies for Implementing Collaborative Framework

Figure 6:
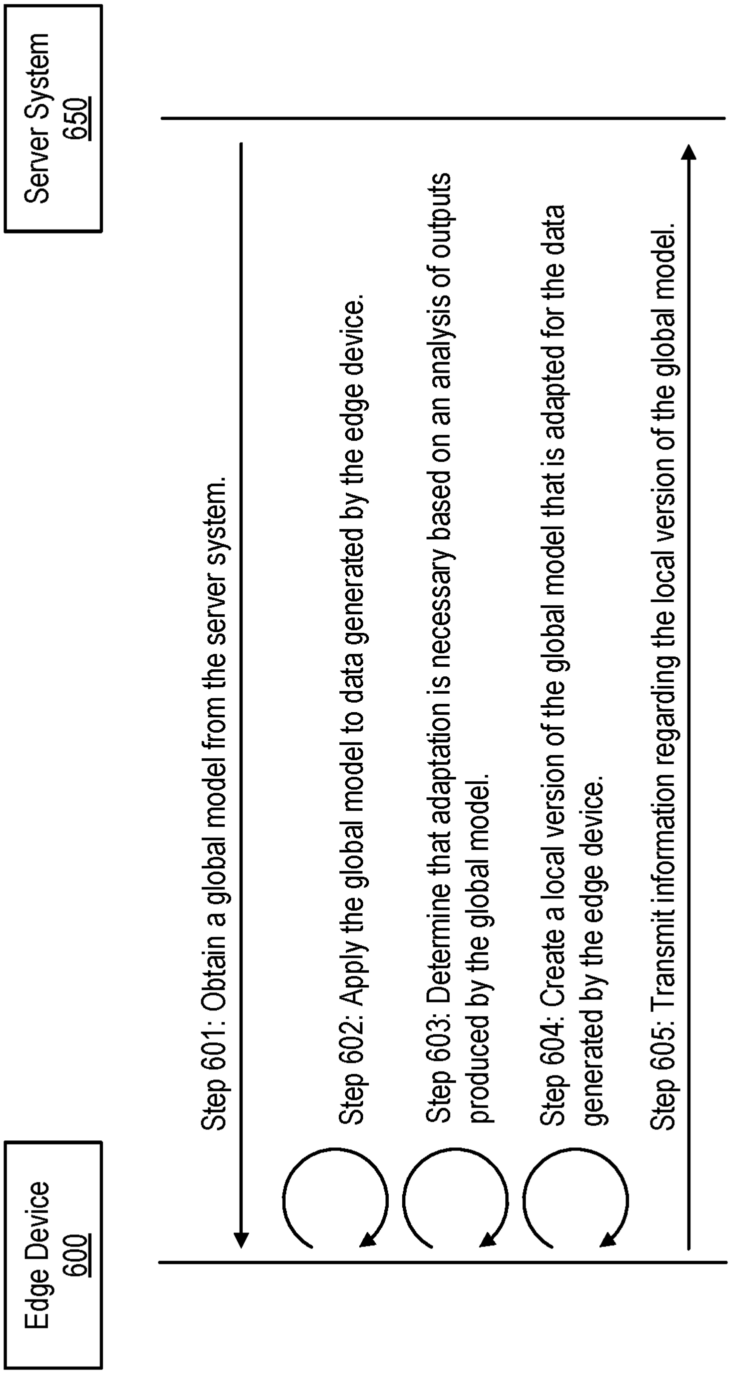
FIG. 6 includes a high-level illustration of communications involving an edge device that is responsible for employing a local model to data generated while monitoring an environment to identify events of interest.

FIG. 6 includes a high-level illustration of communications involving an edge device 600 that is responsible for employing a local model to data generated while monitoring an environment to identify events of interest. As an example, the edge device may be a camera that is responsible for applying a model to images of a home in order to detect objects that are contained in those images. In FIG. 6, the edge device 600 completes a procedure for adapting the model by communicating with a server system 650. However, those skilled in the art will recognize that the actions performed by the server system 650 could also be performed by a mediatory device to which the edge device 600 is communicatively connected.

Initially, the edge device 600 may obtain a global model from the server system 650 (step 601). In some embodiments, the global model is obtained from the server system 650 prior to deployment of the edge device 600 (e.g., during a manufacturing or calibrating process). In other embodiments, the global model is obtained from the server system 650 after deployment of the edge device 600. For example, upon being deployed within an environment of interest, the edge device 600 may establish communication with the server system 650, either directly or indirectly. In such a scenario, the server system 650 may transmit the latest version of the global model to the edge device 600.

Thereafter, the edge device 600 may apply the global model to data that is generated by the edge device 600 (step 602). Each time that the global model is applied to the data, an output that is representative of a prediction or inference may be produced. Referring again to the example above, if the edge device is a camera that generates images of the environment over time, then the model may indicate (e.g., using labels and bounding boxes) the presence of objects in each image.

Over time, the edge device 600 can monitor the performance of the global model. For example, the edge device 600 may compute a metric that is indicative of confidence whenever the global model is applied. Thus, the edge device 600 may continuously track performance of the global model in regard to whether its outputs are accurate. If the metric exceeds a threshold, then the edge device 600 may infer that the global model is performing sufficiently well (and thus no changes are necessary). However, if the metric does not exceed the threshold, then the edge device 600 may infer that performance of the global model is sufficiently poor to merit adaptation. Thus, the edge device 600 may determine that adaptation is necessary based on an analysis of the outputs produced by the global model (step 603).

The edge device 600 can then create a local version of the global model that is adapted for the data generated by the edge device 600 (step 604). Again, assume that the edge device 600 is a camera that generates images of the environment. In such a scenario, the edge device can obtain a series of images that were generated over time and then apply the local version of the global model in order to produce a first series of outputs. As mentioned above, these outputs may be representative of labels and corresponding bounding boxes indicating the presence of certain objects in the series of images. Moreover, the edge device 600 may transmit the series of images to the server system 650. The server system 650 may apply its own version of the global model to the series of images to produce a second series of outputs. Normally, the teacher model that is implemented by the server system 650 is more computationally robust than the local version of the global model that is implemented by the edge device 600. These models may differ due to, for example, the differences in computing resources available to the edge device 600 and server system 650. Moreover, the global model that is implemented by the server system 650 may have been further trained or tuned since it was initially obtained by the edge device 600. By comparing the first and second series of outputs, the edge device 600 can establish how to tune the local version of the global model to account for the environment in which the edge device 600 is deployed (and thus the data that the edge device 600 is generating).

In some embodiments, the edge device 600 transmits information regarding the local version of the global model to the server system 650 (step 605). The server system 650 may simply store this information, for example, in a digital profile associated with the surveillance system of which the edge device is a part. Alternatively, the server system 650 may use this information to improve other edge devices. For example, this information could be incorporated into training of the global model, or this information could be used to tune other edge devices that are part of the same surveillance system as the edge device 600. Thus, improvements may be federated across the surveillance system of which the edge device 600 is a part. For example, if the edge device 600 is a camera that is deployed in the backyard of a home, then any insights gained through adaptation of the local version of the global model could also be applied by another camera that is deployed in the front yard of the home.

Note that the process shown in FIG. 6 could (and often will) be performed iteratively so that the local version of the global model is continually adapted for the data generated by the edge device 600. Thus, steps 602-604 may be repeatedly performed as data is generated by the edge device 600 over time.

Figure 7:
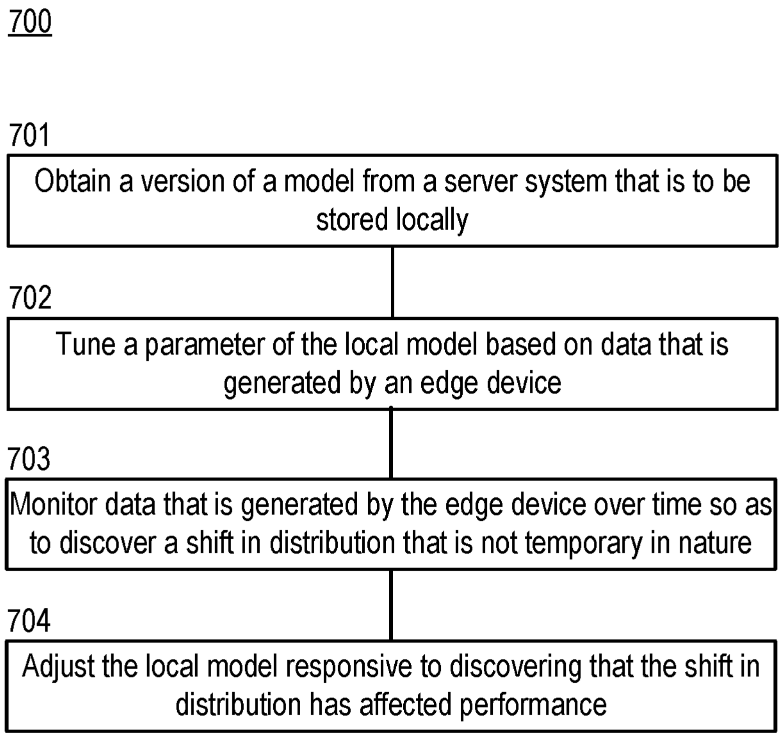
FIG. 7 includes a flow diagram of a process for creating a local model that is adapted for an environment in which an edge device is deployed.

FIG. 7 includes a flow diagram of a process 700 for creating a local model that is adapted for an environment in which an edge device is deployed. Initially, the edge device can obtain a version of a model from a server system that is to be stored locally (step 701). Because this version of the global model is to be stored locally (i.e., on the edge device), it may be referred to as the "local model."

The edge device can then tune parameters of the local model based on data that is generated by the edge device (step 702), so as to ensure that the local model is adapted for the environment in which the edge device is deployed. For example, the edge device may tune the parameters based on an analysis of outputs produced by the local model upon being applied to the data. As another example, the edge device may tune the parameters based on a comparison of (i) outputs produced by the local model upon being applied to the data and (ii) outputs produced by the teacher model upon being applied to the data. Normally, the data must be transmitted back to the server system so that the teacher model can be applied thereto. However, if sufficient processing resources are available on the edge device, then the edge device may be able to apply the local model and teacher model to the data, even though only outputs produced by the local model may be used for inference purposes.

Thereafter, the edge device can monitor the data that is generated over time so as to discover a shift in distribution that is not temporary in nature (step 703). Said another way, the edge device can monitor the data that it generates in order to discover shifts in context (and thus content). To accomplish this, the edge device may examine the outputs produced by the local model upon being applied to the data rather than the data itself. For example, the edge device may track confidence in the outputs produced by the local model in order to determine whether performance is increasing, decreasing, or remaining the same. If the edge device discovers that performance is decreasing, for example, by comparing confidence in the outputs to a threshold, then the edge device may initiate an adaptation procedure. Thus, the edge device may adjust the local model responsive to discovering that the shift in distribution has affected performance of the local model (step 704). Step 704 of FIG. 7 may be substantially similar to step 604 of FIG. 6.

Figure 8:
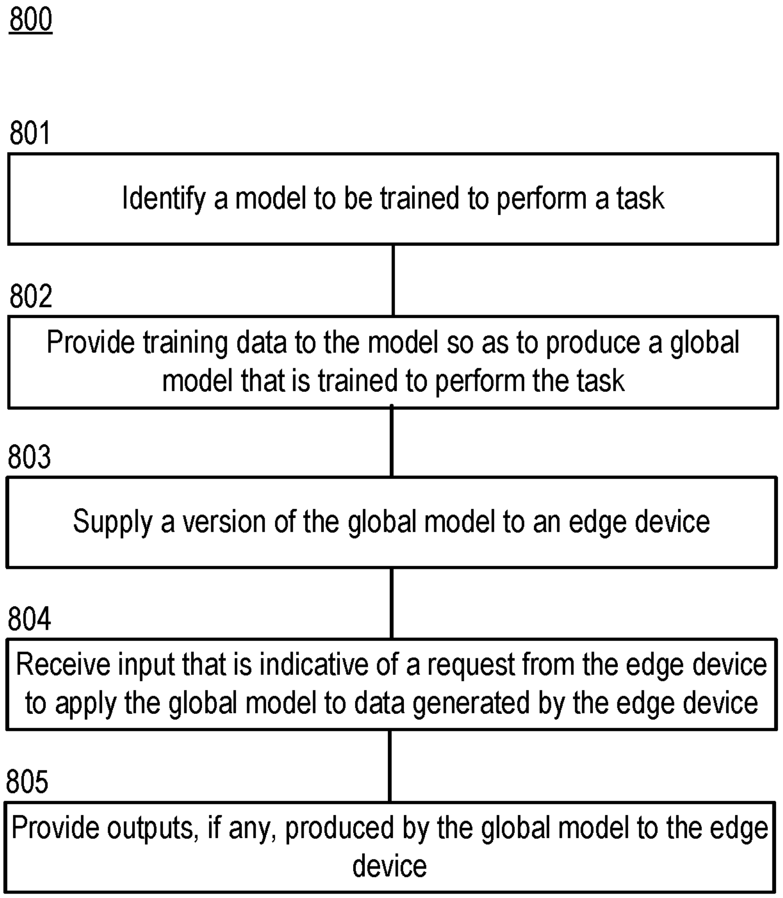
FIG. 8 includes a flow diagram of a process for facilitating the adaptation of a local model by an edge device deployed in an environment to be surveilled.

FIG. 8 includes a flow diagram of a process 800 for facilitating the adaptation of a local model by an edge device deployed in an environment to be surveilled. Initially, a server system can identify a model to be trained to perform a task (step 801). The task (and thus the model) is based on the edge device. For example, if the edge device is a camera, then the model may be one that is able to detect objects in images.

The server system can provide training data to the model so as to produce a global model that is trained to perform the task (step 802). Generally, the training data includes samples and corresponding labels specified by an individual. Referring again to the above-mentioned example, if the model is to be trained to detect objects in images, then the training data may include a series of images along with accompanying bounding boxes that specify the location of the objects in each image. Providing the training data to the model as input allows the model to learn, from the training data, the characteristics that are indicative of the presence of the object.

The server system can then supply a version of the global model to an edge device (step 803). In some embodiments, this occurs during the manufacturing or calibrating process that occurs prior to sale to a user. In other embodiments, this occurs following deployment within an environment to be surveilled by the user. For example, after being deployed, the edge device may initiate a connection with the server system and then request the most recent version of the global model. This local version of the global model may be referred to as a "local model." Thereafter, the edge device may apply the local model to data that is generated in order to produce outputs that are representative of inferences or predictions.

In some embodiments, the server system may receive input that is indicative of a request from the edge device to apply the global model (step 804). Assume, for example, that the edge device determines that the local model should be adapted based on the data that is generated by the edge device. In such a situation, the edge device may determine how to adapt the local model based on a comparison of outputs produced by the local model to outputs produced by the global model as discussed above. Thus, the edge device may request that the server system apply the global model to data that is generated by the edge device. The server system can then provide outputs, if any, produced by the global model to the edge device (step 805). As discussed above with reference to FIG. 7, the edge device may be able to adapt the local model based on those outputs.

Alternatively, the server system may be responsible for adapting the local model as mentioned above. In such embodiments, the edge device may also transmit outputs, if any, produced by the local model to the server system. Then the server system can use (i) the outputs produced by the local model and (ii) the outputs produced by the global model to adapt a version of the global model that can be provided to the edge system for use as the local model.

Unless contrary to possibility, these steps could be performed in various sequences and combinations. For example, an edge device may be able to simultaneously apply a local model for inference purposes and examine the outputs produced by the local model to establish performance. As another example, some steps in the processes of FIGS. 6-8 may be performed repeatedly to ensure that a local model is adapted whenever an analysis of its outputs indicates that performance has degraded past a desired point. Moreover, those skilled in the art will recognize that the processes of FIGS. 6-7 could be concurrently performed by different edge devices in the same surveillance system. Assume, for example, that a surveillance system includes multiple edge devices that are deployed in different locations in an environment of interest. In such a situation, one edge device may determine that its local model should be adapted while another edge device may determine that its local model does not require any changes. Similarly, multiple instances of the process of FIG. 8 could be independently and simultaneously performed by the server system for different edge devices.

Other steps could also be included in some embodiments. As one example, information gleaned through adapting local models could be applied in a federated manner as mentioned above. For instance, adaptations made to a local model employed by one edge device in a given environment could also be made to a local model employed by another edge device in the given environment. As another example, information regarding adaptations of local models may be surfaced for review by an individual. For instance, an owner of a surveillance system may be notified (e.g., via a computer program executing on a computing device, such as a mobile phone or tablet computer) whenever local models employed by edge devices included in the surveillance system are updated.

Processing System

Figure 9:
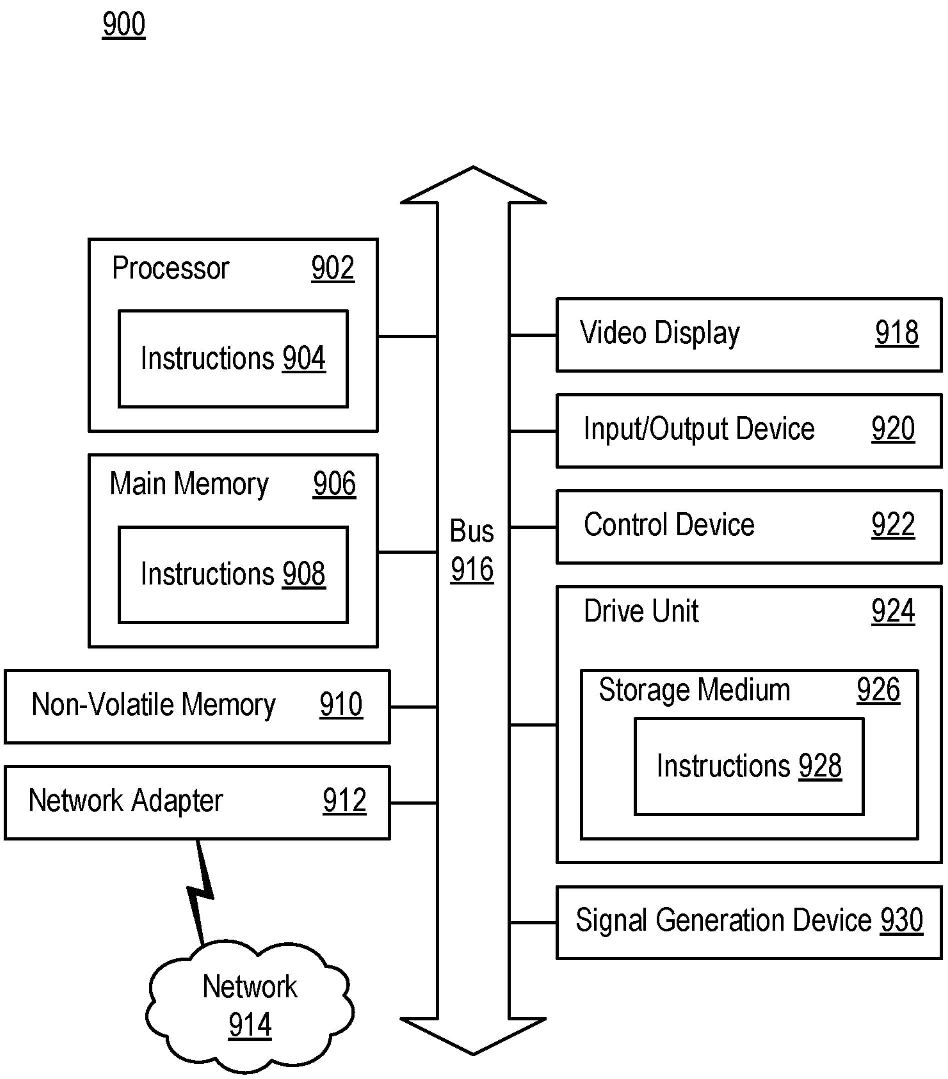
FIG. 9 is a block diagram illustrating an example of a processing system in which at least some processes described herein can be implemented.

FIG. 9 is a block diagram illustrating an example of a processing system 900 in which at least some processes described herein can be implemented. For example, components of the processing system 900 may be hosted on an edge device, mediatory device, or server system.

The processing system 900 may include one or more central processing units ("processors") 902, main memory 906, non-volatile memory 910, network adapter 912, video display 918, input/output devices 920, control device 922 (e.g., a keyboard or pointing device), drive unit 924 including a storage medium 926, and signal generation device 930 that are communicatively connected to a bus 916. The bus 916 is illustrated as an abstraction that represents one or more physical buses or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), Inter-Integrated Circuit ($I^2C$) bus, or an Institute of Electrical and Electronics Engineers (IEEE) standard 1394 bus (also referred to as "Firewire").

The processing system 900 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 900.

While the main memory 906, non-volatile memory 910, and storage medium 926 are shown to be a single medium, the terms "machine-readable medium" and "storage medium" should be taken to include a single medium or multiple media (e.g., a centralized/distributed database and/or associated caches and servers) that store one or more sets of instructions 928. The terms "machine-readable medium" and "storage medium" shall also be taken to include any medium that is capable of storing, encoding, or carrying a set of instructions for execution by the processing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in an electronic device. When read and executed by the processors 902, the instruction(s) cause the processing system 900 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 910, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

The network adapter 912 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A surveillance system comprising:

a server system that is configured to— obtain images that are labelled to indicate that a given object is contained therein, train a model to detect instances of the given object by providing the images to the model as training data, and cause transmission of the trained model to a camera to be deployed in an environment to be surveilled; and the camera that is configured to— generate a first series of images of the environment, and tune parameters of the trained model based on an analysis of the first series of images so as to create a local version of the trained model that is adapted for the environment, wherein the camera is configured to tune the parameters of the trained model in response to a determination that a predetermined number of images of the environment have been captured since the local version of the trained model was last tuned.

2. The surveillance system of claim 1, wherein the camera is further configured to— generate a second series of images of the environment, apply the local version of the trained model to each image included in the second series of images to produce a series of outputs, compute a metric that is indicative of confidence in the series of outputs produced by the local version of the trained model, compare the metric to a threshold, and retune the parameters responsive to a determination that the metric falls beneath the threshold.

3. The surveillance system of claim 1, wherein the camera is further configured to— transmit information regarding the tuned parameters to the server system.

4. The surveillance system of claim 1, wherein the camera is one of multiple cameras to which the server system causes transmission of the trained model, and wherein each camera independently creates a different local version of the trained model.

5. The surveillance system of claim 4, wherein the multiple cameras are deployed in the environment to be surveilled.

6. A method comprising:

obtaining, by an edge device, a model from a server system that has been trained to identify events of interest when applied to data that is generated by the edge device; and tuning, by the edge device, parameters of the model so as to create a local version of the model that is adapted for an environment in which the edge device is deployed, wherein the edge device is configured to perform said tuning responsive to a determination that a predetermined number of images of the environment have been captured since the local version of the trained model was last tuned.

7. The method of claim 6, further comprising:

monitoring, by the edge device, the data that is generated over time so as to discover a shift in content that is not temporary in nature.

8. The method of claim 7, further comprising:

adjusting, by the edge device, the local version of the model responsive to discovering the shift in content by— identifying a portion of the data that corresponds to the shift in content, causing a cloud-based model to be applied to the portion of the data to produce a first output, the cloud-based model being more robust than the local version of the model, applying the local version of the model to the portion of the data to produce a second output, computing a metric indicative of similarity between the first and second outputs, and altering the parameters of the local version of the model based on the metric.

9. The method of claim 8, wherein said causing comprises:

transmitting the portion of the data to the server system, and receiving, from the server system, the first output that is produced by the cloud-based model upon being applied to the portion of the data.

10. The method of claim 6, wherein the edge device is a camera, and wherein the data includes images of the environment.

* * * * *